Feb. 26, 1929. 1,703,087

C. L. DAUN ET AL

DYNAMO ELECTRIC MACHINE

Filed Aug. 30, 1926

Inventors
C. L. Daun
and
P. E. Keller
by W. H. Lieber
Attorney

Patented Feb. 26, 1929.

1,703,087

UNITED STATES PATENT OFFICE.

CARL L. DAUN AND PAUL E. KELLER, OF MILWAUKEE, WISCONSIN, ASSIGNORS, BY MESNE ASSIGNMENTS, TO AMERICAN ELECTRIC MOTOR COMPANY, OF MILWAUKEE, WISCONSIN.

DYNAMO-ELECTRIC MACHINE.

Application filed August 30, 1926. Serial No. 132,336.

This invention relates in general to improvements in the construction of dynamo-electric machines, and relates more specifically to improved stator structure which is especially applicable to electric motors or the like.

An object of the present invention is to provide a dynamo-electric machine which is simple in construction and efficient in operation. Another object of the invention is to provide an improved stator structure for electric motors or the like.

It has heretofore been proposed by us to provide a removable stator structure for electric motors, wherein the stator core is maintained centrally within the main frame, by means of a series of parallel keys coacting with the core periphery and with inwardly extending projections of the frame, the centering keys being retained against lateral displacement by means of abutment surfaces formed on the frame projections and engaging the opposite side surfaces of the keys. While this previous construction effectively centralizes and permits convenient insertion or removal of the stator core, it necessitates recessing or other special formation of the frame in order to provide the key retaining abutments. Such special machinery or formation of the frame structure while not being seriously objectionable in the construction of relatively small machines, undesirably increases the cost of manufacture when applied to the larger size motors.

It is an object of the present invention to provide a simple and efficient substitute for these prior abutments formed on the frame structure for the purpose of retaining the centering keys of a removable stator structure against lateral displacement. In accordance with the present improvement, the main frame is merely provided with a series of core centering surfaces arranged in an annular series around the motor axis, and engageable only with the outer surfaces of the centering keys, and the several keys are retained against lateral displacement by means of abutments formed upon a portion of the stator core instead of being associated with the frame structure.

The present invention is merely an improved form of the removable stator structure constituting the subject of our copending application Serial No. 615,685, filed January 29, 1923, now Patent 1,626,028 issued April 26th, 1927, and any novel subject matter disclosed but not specifically claimed herein, is being claimed in the said prior patent or reissue thereof.

A clear conception of an embodiment of the present invention and of the mode of assembling and of dismantling machines constructed in accordance therewith, may be had by referring to the drawing accompanying and forming a part of this specification in which like reference characters designate the same or similar parts in the several views.

Figure 2:
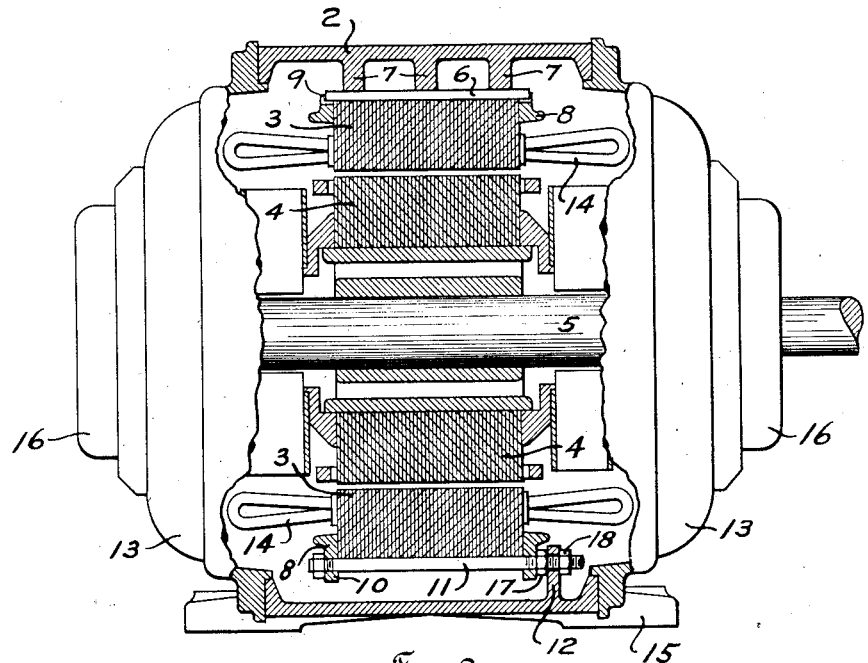
Fig. 2 is a part sectional side view of the electric motor, the section being taken along the line II—II of Fig. 1.
Figure 1:
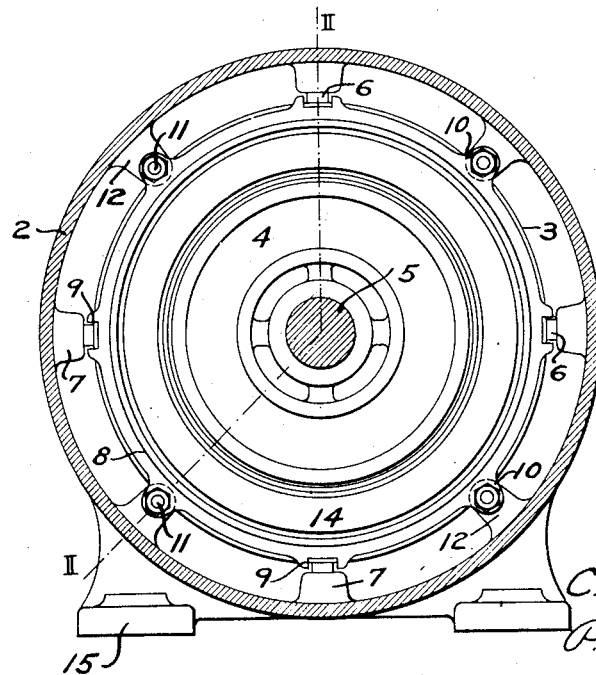
Fig. 1 is a transverse vertical section through the main frame and shaft of an electric motor, showing the details of construction of the stator core positioning and retaining structure, in elevation.

The electric motor to which the invention has been specifically applied herein by way of illustration, comprises in general an annular one-piece main frame 2 having supporting feet 15; an annular laminated stator core 3 disposed centrally within the main frame 2 and having windings 14 located in slots of the core laminæ; a laminated rotor 4 disposed concentrically of and within the stator 3; a main shaft 5 rotatably supporting the rotor 4; and supporting bearings 16 for the shaft 5 secured to the main frame 2 by means of removable end heads 13.

The main frame 2 is provided with a series of integral inwardly extending projections 7 having inner surfaces disposed symmetrically about the motor axis, and may also be provided with an intervening series of integral inwardly extending lugs 12 disposed near one end of the frame 2 and extending inwardly beyond the projections 7 but not beyond the periphery of the core 3. The periphery of the stator core is spaced from the inner surfaces of the projections 7, and with the structure assembled, these spaces are spanned by means of slightly tapered centering keys 6 which project beyond the end laminations of the stator core. End rings 8 coact with the end laminations of the stator core 3 and are provided with outwardly extending sets of abutments 9 located adjacent to the frame projections 7 and adapted to coact with the opposite sides of the projecting ends of the centering keys 6. The end rings 8 and the stator core laminæ are clamped together by means of a series of bolts 11 and clamping nuts 17 cooperating with outwardly projecting ears 10 formed integral with the end rings 8 between the several sets of abutments 9. The projecting threaded ends of the bolts 11 penetrate the lugs 12 of the frame 2, and locking nuts 18 coact with these threaded bolt ends in order to prevent endwise displacement of the stator core 3 when the structure is assembled as shown.

When it is desired to remove the stator core 3 and the windings 14, the end heads 13, rotor 4 and shaft 5 should first be removed, thus making the keys 6 and the locking nuts 18 accessible for removal. The tapered centering keys 6 may then be driven endwise from the spaces between the projections 7 and the periphery of the core 2, and the locking nuts 18 released, thereby permitting free endwise removal of the stator core 2 and its windings 14, as a unit, without disturbing the nuts 17 and hence the clamping of the core laminations. The structure may obviously be readily reassembled, or a new stator may be inserted, with minimum delay, and the abutments 9 serve to positively prevent lateral displacement of the centering keys 6 and to maintain these keys parallel to each other at all times. By forming the abutments 9 upon the end rings 8, rather than upon the frame 2, machining of the relatively heavy frame structure is facilitated as only the core centering surfaces of the projections 7 need be finished. With the clamping bolts 11 and the retaining lugs 12 disposed between the successive centering projections 7 and keys 6, the stator core need not be rotated during insertion or removal thereof, thereby eliminating danger of damaging the stator core or its windings while assembling or dismantling the motor. The improved construction provides simple and efficient means for centering and for locking the stator core within the frame 2, and permits convenient removal or insertion of the stator core and its windings, as a unit.

It should be understood that it is not desired to limit the invention to the exact details of construction and to the precise mode of assembling and of dismantling motor structures, herein shown and described, for various modifications within the scope of the claims, may occur to persons skilled in the art.

It is claimed and desired to secure by Letters Patent:—

1. In combination, a frame having a series of inwardly extending projections and an intervening series of lugs, a laminated stator core disposed within said frame and having its periphery spaced from said projections, said core being provided with laminæ clamping means attachable to said lugs to prevent endwise displacement of said core, keys spanning the spaces between said projections and the periphery of said core to maintain said core centrally within said frame, and means carried by said core and coacting with the sides of said keys to prevent lateral displacement thereof.

2. In combination, a frame having a series of inwardly extending projections and an intervening series of lugs, a laminated stator core disposed within said frame and having end rings coacting with the end laminæ of said core, said core having its periphery spaced from said projections and being provided with laminæ clamping means attachable to said lugs to prevent endwise displacement of said core, keys spanning the spaces between said projections and the periphery of said core to maintain said core centrally within said frame, and abutments on said end rings cooperable with the sides of said keys to prevent lateral displacement thereof.

3. In combination, a frame having a series of inwardly extending projections, a laminated stator core disposed within said frame and having its periphery spaced from said projections, keys spanning the spaces between said projections and the periphery of said core to maintain said core centrally within said frame, means carried by said core and cooperable with the sides of said keys to prevent lateral displacement thereof, and means for simultaneously clamping the laminæ of said core together and for locking said core against end displacement.

4. In combination, a frame having a series of inwardly extending projections, a laminated stator core disposed within said frame and having end rings coacting with the end laminæ of said core, said core having its periphery spaced from said projections, keys spanning the spaces between said projections and the periphery of said core to maintain said core centrally within said frame, abutments on said end rings cooperable with the sides of said keys to prevent lateral displacement thereof, and clamping means for simultaneously locking said rings and said laminæ together and for preventing endwise displacement of said core.

5. In combination, a one piece annular frame having a series of inwardly extending projections, a stator core disposed within said frame and having its periphery spaced from said projections, keys spanning the spaces between the periphery of said core and said projections to maintain said core centrally within said frame, and abutments formed on said core and coacting with the sides of said keys to prevent lateral displacement thereof.

6. In combination, a frame having a plurality of inwardly extending projections, a stator core disposed within said frame and having its periphery spaced from said projections, said core having end rings provided with spaced abutments adjacent to each of said projections, and keys disposed in the spaces between said abutments and spanning the spaces between said projections and the periphery of said core to maintain the latter centrally within said frame.

7. In combination, a frame having a series of internal surfaces spaced about an axis, a key coacting with each of said surfaces, a stator core having peripheral contact with all of said keys, and a plurality of spaced abutments formed on said stator and coacting with said keys to prevent lateral displacement thereof.

8. In a dynamo electric machine, the combination of a frame, a laminated stator core within said frame but peripherally spaced therefrom, and having end rings with means associated therewith for continuously holding the core securely together, a plurality of keys driven into binding contact between said core and frame to accurately center and anchor said core within said frame, abutments on said end rings cooperable with the sides of said keys to prevent lateral displacement thereof, said keys being independently removable to free said core from the frame.

9. In a dynamo electric machine, the combination of a frame, a laminated stator core within said frame but peripherally spaced therefrom and having end rings with means associated therewith for continuously holding the core securely together, a plurality of spacer elements removably inserted between said core and frame and coacting therebetween to center and positively anchor said core therein, abutments on said end rings cooperable with the sides of said keys to prevent lateral displacement thereof said keys being independently removable to free said core from the frame.

In testimony whereof, the signatures of the inventors are affixed hereto.

CARL L. DAUN.
PAUL E. KELLER.